(12) United States Patent
Hoffmann et al.

(10) Patent No.: US 11,016,738 B2
(45) Date of Patent: May 25, 2021

(54) CHANGE CONTROL MANAGEMENT OF CONTINUOUS INTEGRATION AND CONTINUOUS DELIVERY

(71) Applicant: SAP SE, Walldorf (DE)

(72) Inventors: Thomas Hoffmann, Walldorf (DE); Wolfram Kramer, Weingarten (DE); Michael Dohle, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/663,155

(22) Filed: Oct. 24, 2019

(65) Prior Publication Data
US 2020/0201606 A1    Jun. 25, 2020

(30) Foreign Application Priority Data

Dec. 19, 2018 (EP) .................................... 18214173

(51) Int. Cl.
| | | |
|---|---|---|
| G06F 9/44 | (2018.01) | |
| G06F 8/30 | (2018.01) | |
| G06F 8/60 | (2018.01) | |
| G06F 9/38 | (2018.01) | |
| G06F 11/36 | (2006.01) | |

(52) U.S. Cl.
CPC .................. *G06F 8/30* (2013.01); *G06F 8/60* (2013.01); *G06F 9/3836* (2013.01); *G06F 11/3668* (2013.01)

(58) Field of Classification Search
CPC . G06F 8/30; G06F 8/60; G06F 9/3836; G06F 11/3668
USPC ................................. 717/110–110, 120–128
See application file for complete search history.

(56) References Cited

U.S. PATENT DOCUMENTS

| | | | | |
|---|---|---|---|---|
| 7,945,589 B1* | 5/2011 | Weiss | .......................... | G06F 8/71 707/795 |
| 8,978,008 B2* | 3/2015 | Kramer | ..................... | G06F 8/71 717/121 |
| 9,021,458 B1* | 4/2015 | Jacob | ........................ | G06F 8/60 717/168 |
| 9,658,846 B2* | 5/2017 | Kramer | ..................... | G06F 8/71 |
| 9,965,377 B1 | 5/2018 | Russell et al. | | |
| 9,983,860 B1* | 5/2018 | Koty | ........................ | H04L 67/10 |
| 10,437,586 B2* | 10/2019 | Dasgupta | .................. | G06F 8/10 |
| 2016/0378434 A1 | 12/2016 | Martick | | |
| 2018/0321993 A1 | 11/2018 | McClory et al. | | |

OTHER PUBLICATIONS

Zhang et al., "One Size Does Not Fit All: An Empirical Study of Containerized Continuous Deployment Workflows", Nov. 2018, ACM, pp. 295-306. (Year: 2018).*

(Continued)

*Primary Examiner* — Ted T. Vo
(74) *Attorney, Agent, or Firm* — Sterne, Kessler, Goldstein & Fox P.L.L.C.

(57) ABSTRACT

Disclosed herein are system, method, and computer program product embodiments for changing a software code when executed by a PS ("production system"). An embodiment operates by pulling a copy of master code, entering changes to the copy of the master code, sending a request for staging a code push, sending a request for a voter build of staging code, and testing the changes.

20 Claims, 5 Drawing Sheets

(56) References Cited

OTHER PUBLICATIONS

Shiau et al., "A Documented Configuration Change Control Workflow to Conceptual Design for Supply Chain", 2006, IEEE, pp. 697-702. (Year: 2006).*
Mohan et al., "Improving the Change—Management Process", 2008, Communications of the ACM, vol. 51. No. 5, pp. 59-64. (Year: 2008).*
Extended European Search Report, dated Feb. 26, 2019, for European Patent Appl. No. 18214173.9, 10 pages.

* cited by examiner

CHANGE CONTROL MANAGEMENT OF CONTINUOUS INTEGRATION AND CONTINUOUS DELIVERY

CROSS-REFERENCE TO RELATED APPLICATIONS

This application claims priority to European Patent Application No. 18214173.9 titled "A Method For Changing Software Code Executed By A Production System", filed Dec. 19, 2018, which is herein incorporated by reference in its entirety.

BACKGROUND

Continuous integration ("CI") is a software development technique. CI is popular in the developer community as it fosters developer creativity and allows quick development cycles. However, CI does not cover requirements in the area of compliance such as auditable documentation for regulatory purposes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a method for changing software code executed by a production system.

A 'PS' as understood herein is a production system or production environment where software code is executed for controlling some real-world process such as for manufacturing control, process control, logistics or financial transactions. This typically requires real-time capability of the production system that matches the dynamics of the real-world process to be controlled combined with high availability and no or limited system downtimes.

A 'CI' as used herein refers to a continuous integration server.

A 'CMCS' refers to a change management computer system that provides and enforces a predefined workflow for processing change requests.

A 'SCMS' refers to a source code management computer system for storing and managing various versions of software code.

A 'DCS' refers to a developer computer system, such as a PC ("personal computer"), workstation or mobile computer.

A 'TMS' refers to a transport management system, such as SAP's TMS, that is used to transport data objects, including executable code, between different systems.

A 'TS' refers to a test system for testing of software code.

An 'artifact' refers to machine code which is built from the software code retrieved from the SCMS and which is deployable and executable on systems like TS or PS.

A 'container' refers to a data file having a data type that enables to contain and transport an artifact; a container can be generated by the TMS and has an assigned container identifier.

Embodiments described herein enable to use the concept of CI for fostering develop creativity and quick development cycles with the safety and quality control of CMCS. In accordance with embodiments this is accomplished by the CMCS controlling the integration of new code into the SCMS as well as the deployment of artifacts emerging from the CI/SCMS domain in accordance with a predefined workflow implemented by the CMCS.

Figure 1:
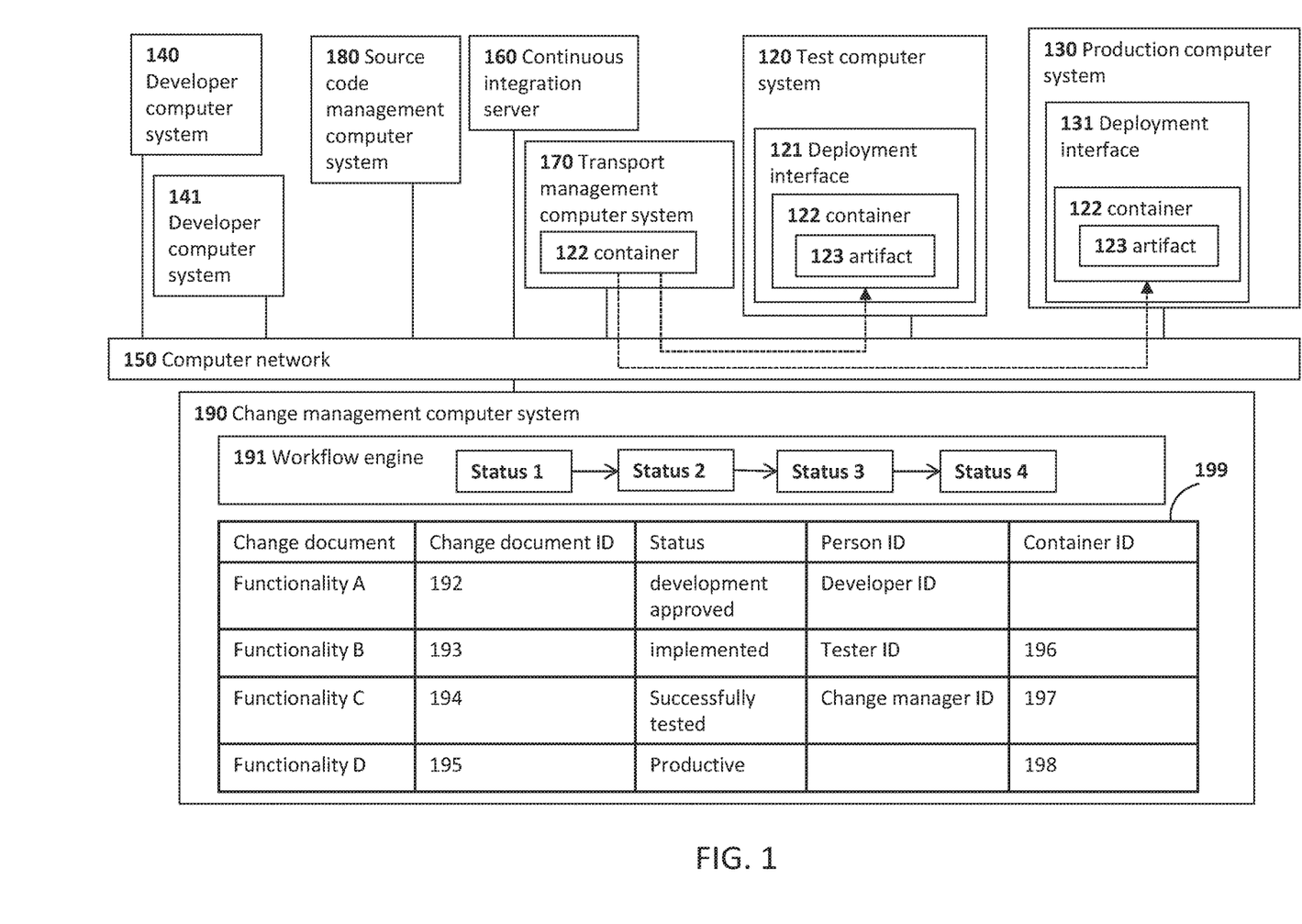
FIG. 1 is a block diagram of an embodiment of a computer system configured to change software code executed by a production system.

FIG. 1 shows a CMCS 190 that is coupled to a computer network 150 to enable communication with various other computer systems, such as developer computer systems 140, 141, . . . , source code management computer system, SCMS, 180, continuous integration server, CI, 160, transport management computer system, TMS, 170, test computer system, TS, 120 and production computer system, PS, 130.

The CMCS comprises an electronic memory for storing one or more tables such as table 199 that contains information relative to change documents. Each one of the change documents specifies a desired functionality of the software code that is being executed by the PS.

An identifier 'change document ID' and a status are assigned to each change document in the table 199. The status can be status 1, i.e. 'development approved', status 2, i.e. 'implemented', status 3, i.e. 'successfully tested', or status 4, 'productive'. Each status transition of a given change document is controlled by a workflow engine 191 that is executed on the CMCS.

In the example considered here, there a four change documents A, B, C and D that specify respective functionalities A, B, C and D to be implemented. Change document A has change document ID 192 and status 1, i.e. 'development approved'.

Further, a developer that is identified by his or her developer ID in table 199 has been assigned to the task of implementing the functionality A into the software code. Likewise, change document B that has status 2 has an assigned tester that is identified by his or her tester ID in the table 199. Change document C that has status 3 has an assigned change manager that is identified in the table 199 by his or her respective change manager ID. Table 199 also identifies a container generated by the TMS, if any, for an artifact that has been generated for testing, and if the test is successful, deployment.

In operation, one of the developers having the developer ID that is assigned to change document A in the table 199 logs into one of the developer computer systems such as DCS 140 and authenticates against DCS 140 such as by means of a single sign-on. Alternatively, the user authenticates against the user interfaces of the SCMS, CI and CMCS that each have a user interface that can be displayed on the DCS for access by the developer.

In accordance with an embodiment, the SCMS, CI and CMCS each may have a user interface that can be displayed on the DCS for access by the developer.

In the following a sequence of steps is executed for changing the software code making reference to the UML diagram given in FIG. 2a-d, according to an embodiment.

Figure 2A:
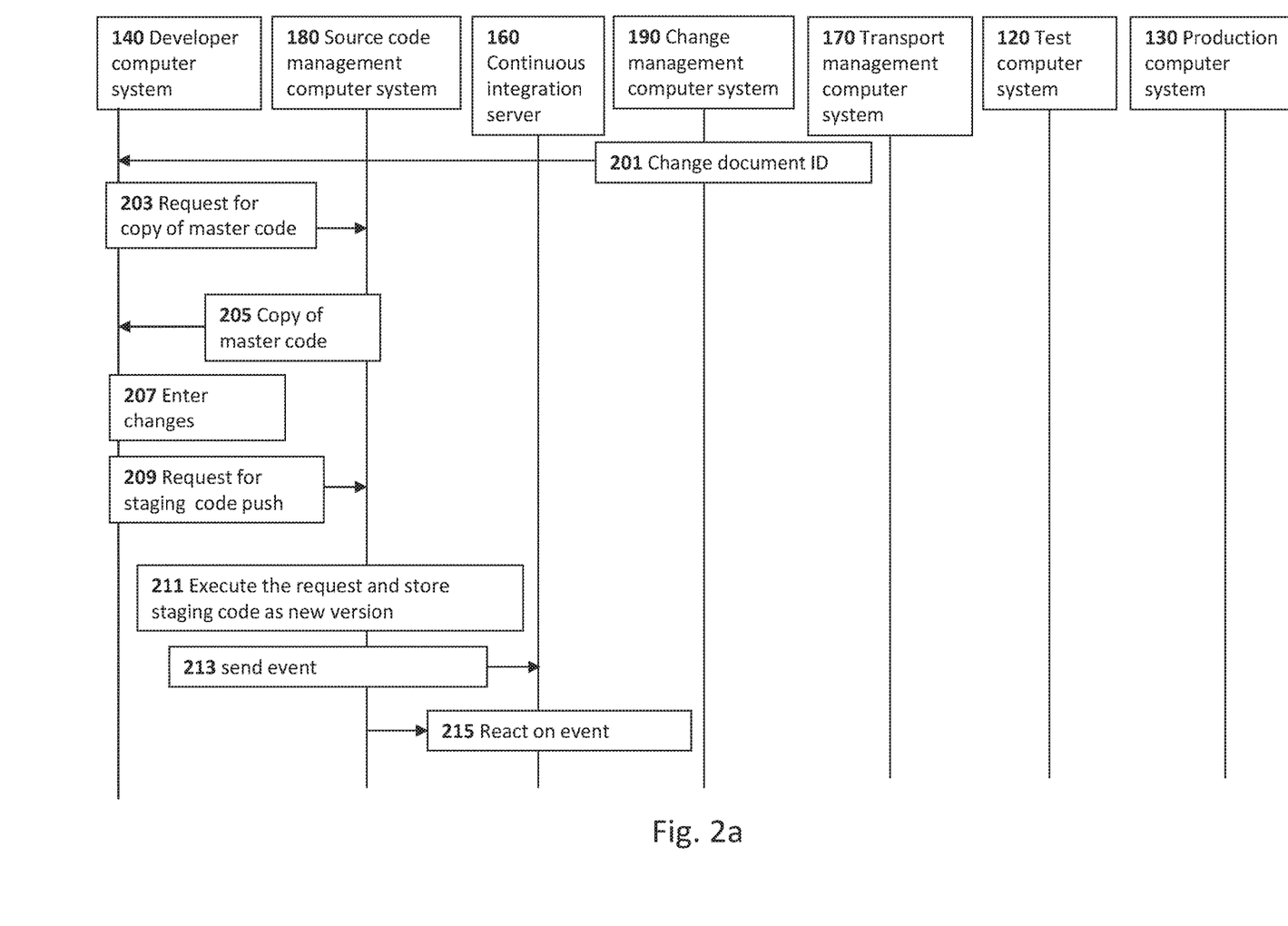
FIGS. 2A-2D are a unified modeling language (UML) diagram illustrating an embodiment of a method for changing software code executed by a production system.

In step 201 the change document ID that is assigned to change document A in the table 199 is communicated to the developer such as by displaying the change document ID on a user interface of the CMCS that is shown on the DCS 140.

Next, the developer requests a copy of the master code from the SCMS (step 203) and obtains a copy of the requested master code in step 205. In step 207 the developer enters changes into the copy of the master code in order to implement the specified functionality A which provides the so-called staging code, i.e. the changed copy of the master code into which the desired functionality A has been implemented.

In step 209 a staging code push is requested for storing the staging code on the SCMS. This request comprises the change document D. In response to step 209 the SCMS executes the request and stores the staging code with the embedded change document ID for later reference (step 211). The request of step 209 is thus executed and the staging code is stored as a new staging code version. Further, the SCMS sends an event in step 213 that signals that a new staging code version has been stored. The CI reacts to the event in step 215 by interpreting the event as a request for voter built.

Further, in step 215 the CI obtains the staging code for which the voter build has been requested and extracts the change document ID from the staging code in response to the event. In step 217 the CI communicates with the CMCS to check whether three criteria are fulfilled:

i. The change document ID that has been extracted from the staging code in step 215 matches the change document ID given in the table 199 that is assigned to the developer ID of the developer that has logged on initially on DCS 140.

ii. The assigned status must be the first status, i.e. 'development approved'. This status reflects that the implementation of the functionality A as described in the change document A has in fact been approved. This prevents the implementation of functionalities without explicit approval resulting from an appropriate review process.

iii. The assignment of the change document having the change document ID extracted from the staging code in step 215 in table 199 needs to be to the developer having the developer ID as indicated in the table 199 which needs to be the developer that has performed the sign-on on DCS 140.

Figure 2B:
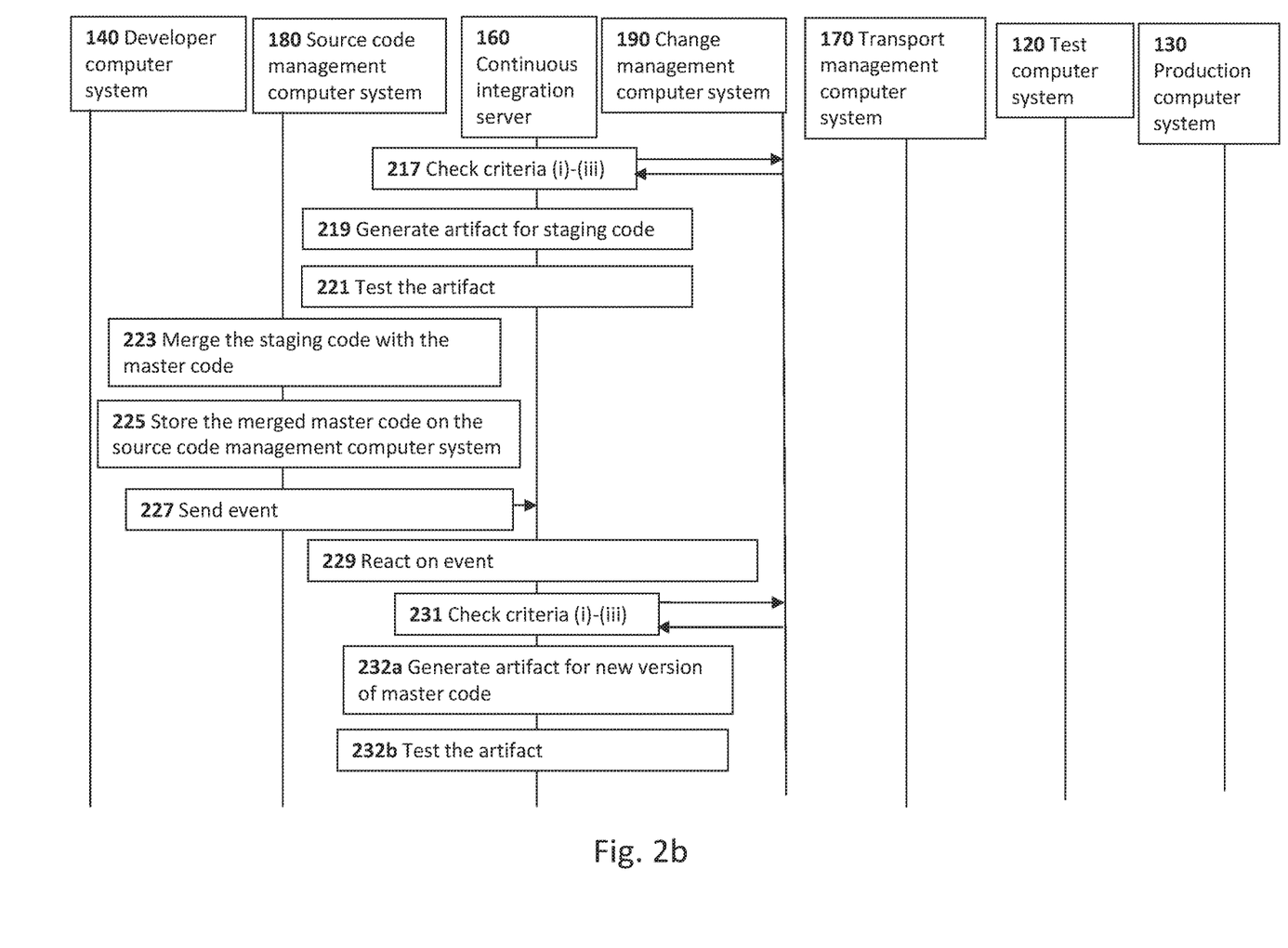

If all three conditions (i) to (iii) are fulfilled the CI generates an artifact for the staging code in step 219, In step 221 the artifact is tested by the CI which may involve automated testing procedures. If testing is unsuccessful, the procedure aborts at this stage and the developer may be notified accordingly. If testing is successful, the staging code is merged with the master code in step 223 such that an updated version of the master code containing the functionality A is stored on the SCMS in step 225.

In response to step 225 the SCMS sends an event message to the CI in step 227. The event message indicates that the merge has been performed and is interpreted by the CI as a request for a CI built of the master code. In other words, the SCMS signals that an updated version of the master code has been stored by sending the event message which triggers the CI to generate an artifact for the new version of the master code.

Further, in step 229 the CI obtains the updated master code from the SCMS and extracts the change document ID from the master code. Next, in step 231 the CI communicates with the CMCS to check the criteria (i) to (iii) again as a precondition for generating an artifact and testing the artifact analogous to steps 217, 219 and 221, respectively: If all criteria (i) to (iii) are met, in step 232*a* an artifact is generated by the CI for the new version of the master code for subsequent testing in step 232*b*.

If testing of the artifact that results from the updated version of the master code is unsuccessful, the procedure aborts and the developer may be notified accordingly. Otherwise, if testing is successful step 233 is executed by requesting the creation of a container 122. The request comprises the change document ID.

Figure 2C:
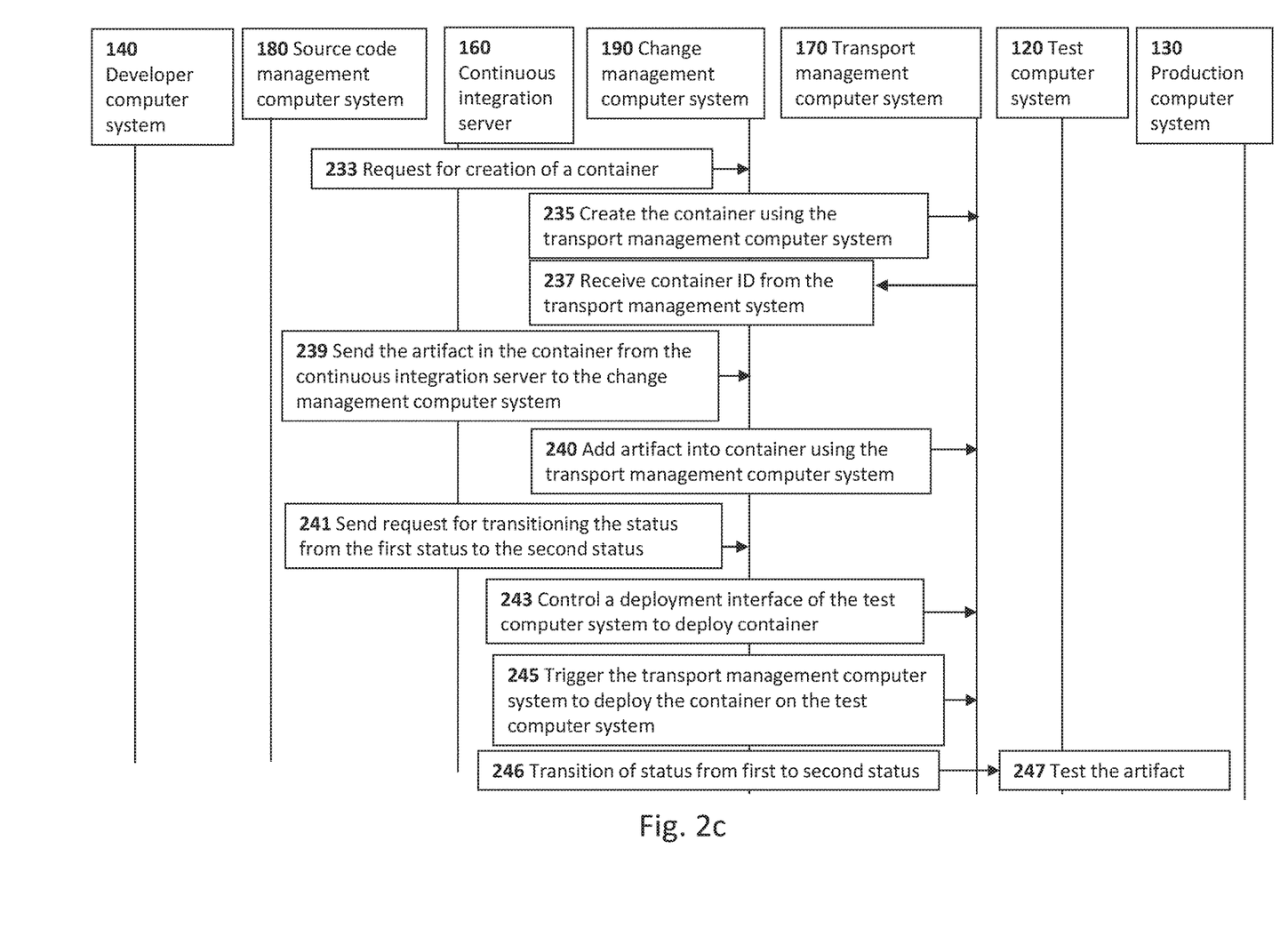

In response to the request the CMCS uses the TMS to create the container 122 (step 235). The TMS returns a container identifier to the CMCS that identifies the created container 122 (step 237). The container identifier is entered into the table 199 and is thus assigned to the change document A for later reference. In step 239 the CI sends the artifact 123 that was built in step 232*a* to the CMCS and the CMCS requests the TMS in step 240 to insert the artifact 123 into the container 122.

In step 241 the CI sends a request to the CMCS for transitioning the status from the first to the second status such that the status 'implemented' is assumed in accordance with the sequence as predefined and enforced by the workflow engine 191. Another status transition other than from status 1 to status 2 is not allowed and will not be executed by the CMCS as this would conflict with the sequence of steps as predefined by the workflow engine 191.

For example, if the CI would request a status transition from status 1 to status 3 such a status transition would be refused for thus enforcing the predefined rules for the software development. The request for the status transition comprises the change document identifier for referencing the respective change document A in the table 199.

In step 243 the CMCS controls the deployment interface 121 of the TS to protect the systems integrity and to only allow deployment of the artifact 123 of container 122 in accordance with the change management process by unblocking the deployment interface 121. In step 245 the CMCS triggers the TMS to deploy the container on the TS. In response to an acknowledgement received from the TMS as regards deployment of the container the CMCS blocks the deployment interface 121 of the TS.

Next, step 246 is performed in order to execute the request 241 if deployment in TS was successful thus transitioning the status from status 1 to status 2.

Figure 2D:
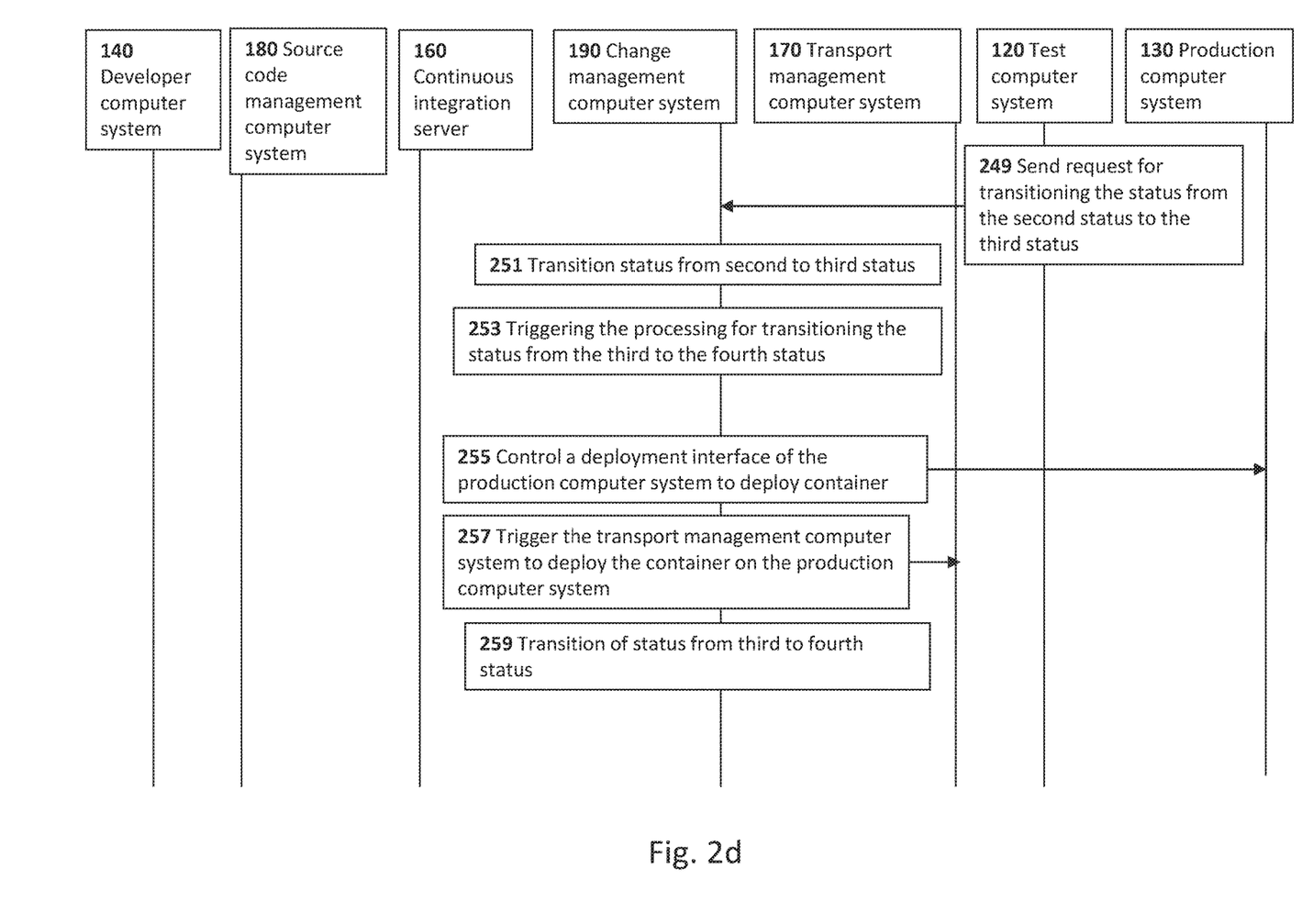

Due to the status transition to status 2 a tester having a tester ID assigned to the document A is informed to test the artifact 123 on the test computer system 120 (step 247). If the test is successful, a request is sent in step 249 for transitioning the status from the second status to the third status and the requested status transition occurs in step 251.

As a consequence, a change manager having a change manager ID assigned to the change document A is informed. If the change manager enters a confirmation in step 253 this triggers the processing in the CMCS for transitioning the status from the third to the fourth status.

In step 255 the CMCS controls the deployment interface 131 of the PS to protect the systems integrity and to only allow deployment of the artifact 123 of container 122 in accordance with the change management process by unblocking the deployment interface 131. In step 257 the CMCS triggers the TMS to deploy the container on the PS. In response to an acknowledgement received from the TMS as regards deployment of the container the CMCS blocks the deployment interface 121 of the PS.

In step 259 the status transitions from the status 3 to status 4 to reflect that the new version of the master code has been deployed in the PS.

In accordance with an embodiment, the deployment interface 121 has a blocked state and an unblocked state. These blocking states are controlled by the CMCS. In the blocked state it is impossible to enter the container containing an artifact into the test computer system 120 in order to protect the TS against unauthorized entry of artifacts that may be detrimental for the integrity of the TS. The default state of the deployment interface 121 is blocked.

Unblocking of the deployment interface 121 can be performed by the CMCS by sending a control signal via the computer network 150. In response to receipt of the control signal by the TS, the deployment interface 121 transitions into the unblocked state. The deployment interface 121 may assume the unblocked state for a predefined time period before it falls back automatically into the blocked state. This time period may have a short time duration such as 1 microsecond or below 1 microsecond to prevent the TS from malicious attacks or accidental infiltration of undesired artifacts.

In addition or as an alternative, the control signal may comprise the container ID of the container 122 that carries the artifact 123 to be tested. In this instance the deployment interface 121 accepts the container only if the container has the same container ID as has been previously communicated via the control signal.

As an alternative or in addition the CMCS may have an assigned cryptographic certificate. In this instance the CMCS signs the control signal using its certificate and the TS checks the authenticity of the control signal by checking the validity of the signature. In this case, the validity of the signature is an additional condition for entry of the artifact 123 contained in the container 122 via the deployment interface 121.

As an alternative or in addition the CMCS and the TS perform a mutual authentication procedure before entry of the container 122 via the deployment interface 121 into the TS. During the mutual authentication a secure communication channel may be established between the CMCS and the TS such as by establishment of a session key whereby the control signal is encrypted by the CMCS using the session key and decrypted by the TS using the same session key.

The same may apply analogously to the deployment interface 131 of the PS.

In an embodiment, the container 122 containing artifact 123 that has been entered into the TS and successfully tested is identical to the container 122 with artifact 123 that is eventually entered into the PS via the deployment interface 131 to replace the software code executed by the PS by the new version given by artifact 123. This may ensure that only what has been successfully tested is entered into the PS.

In accordance with an embodiment, the deployment of the artifact 123 and the PS may be scheduled by a scheduler. The scheduler may schedule the deployment during a time period when the load of the PS is below average. A number of code changes can be collected as a batch job and scheduled to be deployed at such a time period of relatively low system load of the PS.

In an embodiment, a combination of the CI and CMCS paradigms is facilitated thus enabling both continuous delivery of software code and change management for production computer systems and production environments that perform real-time control functions or other critical control functions of real-world processes such as in manufacturing, chemical production plant control, logistics and financial transaction systems.

What is claimed is:

1. A method for changing a software code executed by a PS ("production system"), the method being implemented by a computer system comprising:
   a continuous integration ("CI") server,
   a source code management computer system ("SCMS"),
   a plurality of developer computer systems ("DCSs"), wherein one of the DCSs is assigned to a developer via an assignment,
   a transport management system ("TMS"),
   a test system ("TS") being coupled by a network,
   a change management computer system ("CMCS") comprising a workflow engine for enforcing and documenting a workflow for processing a plurality of change documents, wherein at least one of the change documents is assigned to the developer and comprises a specification for specifying a desired functionality of the software code, the change document comprising an assigned change document identifier and a change document status, wherein the status comprises one of: a first status ("development approved"), a second status ("implemented"), a third status ("successfully tested") or a fourth status ("productive"), and
   wherein the TS and the PS have a respective deployment interface, controlled by the CMCS, for deploying of an artifact, the method comprising:
      outputting the assignment of the change document identifier to the developer by the CMCS;
      pulling a copy of master code from the SCMS onto the DCS of the developer;
      entering changes to the copy of the master code into DCS to provide staging code that has desired functionality;
      sending a request for staging a code push from the DCS to the SCMS for storing the staging code on the SCMS, wherein the request comprises the change document identifier;
      executing the request by the SCMS and embedding the change document identifier into the staging code;
      sending a request for voter build of the staging code from the SCMS to CI;
      executing the request for voter build by the CI by obtaining the staging code from the SCMS, extracting the document identifier from the staging code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the staging code, testing the artifact,
   wherein if the test is successful:
      merging the staging code with the master code and storing the merged master code on the SCMS to enable access to the changed master code resulting from the merging by other developers;
      sending a request for CI build of the master code from the SCMS to CI;
      executing the request for CI build by the CI by obtaining the master code from the SCMS, extracting the document identifier from the master code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the master code, testing the artifact;

sending a request from CI to CMCS for the creation of a container, the request comprising the change document identifier, wherein the CMCS uses the TMS for the creation of the container, the TMS returning a container identifier to CMCS;

sending the artifact from CI to CMCS, wherein the CMCS inserts the artifact into the container provided by TMS; and sending a request from the CI to the CMCS for transitioning the status from the first to the second status, the request comprising the change document identifier, wherein the CMCS triggers the TMS to deploy the container on the TS whereby the CMCS controls the deployment interface of the TS to allow deployment of the artifact inside the container; and testing the artifact on the TS by a tester and if successful, sending a request from the TS to the CMCS for transitioning the status from the second to the third status, the request comprising the change document identifier; and confirming the change document by a change manager, wherein the confirming comprises triggering the processing in the CMCS for transitioning the status from the third to the fourth status, wherein the CMCS triggers the TMS to deploy the container on the PS, whereby the CMCS controls the deployment interface of the PS to allow deployment of the artifact inside the container.

2. The method of claim 1, wherein the deployment interface having a blocked status and an unblocked status, the blocked status being a default status, wherein the deployment interface is configured to allow entry of a container containing an artifact if the deployment interface is in its unblocked status, wherein the deployment interface receives a control signal from the CMCS for deploying of an artifact.

3. The method of claim 2, wherein the control signal comprises the container identifier of the container containing the artifact to be deployed and further comprising checking via the deployment interface whether the container identifier comprised in the control signal matches the container identifier of the container that comprises the artifact to be deployed, wherein the deployment is only allowed in case of a match.

4. The method of claim 2, wherein the CMCS has an assigned cryptographic security certificate and further comprising signing the control signal by the CMCS using the certificate.

5. The method of claim 4, further comprising:
performing mutual authentication of the CMCS and the deployment interface; and
establishing a secure communication channel between the CMCS and the deployment interface, wherein the control signal or the container is transmitted to the deployment interface via the secure communication channel.

6. The method of claim 2, wherein each of the SCMS, CI and CMCS have a respective user interface which can be displayed on the DCS for access by the developer, and wherein authentication of the developer against each user interface is performed as a single sign on.

7. The method of claim 2, wherein the PS comprises one of: a manufacturing control system, a logistics system, a financial transactions system, a process control system or other control system having real time capability.

8. The method of claim 2, wherein deployment of the artifact via the deployment interface of the PS is scheduled by means of a scheduler.

9. The method of claim 2, wherein deployment of the artifact via the deployment interface of the PS is executed as a batch job when the load of the PS is below average.

10. A computer system for changing a software code executed by a PS ("production system"), comprising:
a continuous integration ("CI") server,
a source code management computer system ("SCMS"),
a plurality of developer computer systems ("DCSs"), wherein one of the DCSs is assigned to a developer via an assignment,
a transport management system ("TMS"),
a test system ("TS") being coupled by a network,
a change management computer system ("CMCS") comprising a workflow engine for enforcing and documenting a workflow for processing a plurality of change documents, wherein at least one of the change documents is assigned to the developer and comprises a specification for specifying a desired functionality of the software code, the change document comprising an assigned change document identifier and a change document status, wherein the status comprises one of: a first status ("development approved"), a second status ("implemented"), a third status ("successfully tested") or a fourth status ("productive"), and
wherein the TS and the PS have a respective deployment interface, controlled by the CMCS, for deploying of an artifact, the method comprising:
outputting the assignment of the change document identifier to the developer by the CMCS;
pulling a copy of master code from the SCMS onto the DCS of the developer;
entering changes to the copy of the master code into DCS to provide staging code that has desired functionality;
sending a request for staging a code push from the DCS to the SCMS for storing the staging code on the SCMS, wherein the request comprises the change document identifier;
executing the request by the SCMS and embedding the change document identifier into the staging code;
sending a request for voter build of the staging code from the SCMS to CI;
executing the request for voter build by the CI by obtaining the staging code from the SCMS, extracting the document identifier from the staging code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the staging code, testing the artifact,
wherein if the test is successful:
merging the staging code with the master code and storing the merged master code on the SCMS to enable access to the changed master code resulting from the merging by other developers;
sending a request for CI build of the master code from the SCMS to CI;
executing the request for CI build by the CI by obtaining the master code from the SCMS, extracting the document identifier from the master code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the master code, testing the artifact;

sending a request from CI to CMCS for the creation of a container, the request comprising the change document identifier, wherein the CMCS uses the TMS for the creation of the container, the TMS returning a container identifier to CMCS;

sending the artifact from CI to CMCS, wherein the CMCS inserts the artifact into the container provided by TMS; and sending a request from the CI to the CMCS for transitioning the status from the first to the second status, the request comprising the change document identifier, wherein the CMCS triggers the TMS to deploy the container on the TS whereby the CMCS controls the deployment interface of the TS to allow deployment of the artifact inside the container; and testing the artifact on the TS by a tester and if successful, sending a request from the TS to the CMCS for transitioning the status from the second to the third status, the request comprising the change document identifier; and confirming the change document by a change manager, wherein the confirming comprises triggering the processing in the CMCS for transitioning the status from the third to the fourth status, wherein the CMCS triggers the TMS to deploy the container on the PS, whereby the CMCS controls the deployment interface of the PS to allow deployment of the artifact inside the container.

11. The computer system of claim 10, wherein the deployment interface having a blocked status and an unblocked status, the blocked status being a default status, wherein the deployment interface is configured to allow entry of a container containing an artifact if the deployment interface is in its unblocked status, wherein the deployment interface receives a control signal from the CMCS for deploying of an artifact.

12. The computer system of claim 11, wherein the control signal comprises the container identifier of the container containing the artifact to be deployed and further comprising checking via the deployment interface whether the container identifier comprised in the control signal matches the container identifier of the container that comprises the artifact to be deployed, wherein the deployment is only allowed in case of a match.

13. The computer system of claim 11, wherein the CMCS has an assigned cryptographic security certificate and further comprising signing the control signal by the CMCS using the certificate.

14. The computer system of claim 13, configured to perform operations comprising:
  performing mutual authentication of the CMCS and the deployment interface; and
  establishing a secure communication channel between the CMCS and the deployment interface, wherein the control signal or the container is transmitted to the deployment interface via the secure communication channel.

15. The computer system of claim 11, wherein each of the SCMS, CI and CMCS have a respective user interface which can be displayed on the DCS for access by the developer, and wherein authentication of the developer against each user interface is performed as a single sign on.

16. The computer system of claim 11, wherein the PS comprises one of: a manufacturing control system, a logistics system, a financial transactions system, a process control system or other control system having real time capability.

17. The computer system of claim 11, wherein deployment of the artifact via the deployment interface of the PS is scheduled by means of a scheduler.

18. The computer system of claim 11, wherein deployment of the artifact via the deployment interface of the PS is executed as a batch job when the load of the PS is below average.

19. A non-transitory computer readable medium comprising executable instructions for changing a software code when executed by a PS ("production system"), when executed by a computing system comprising:
  a continuous integration ("CI") server,
  a source code management computer system ("SCMS"),
  a plurality of developer computer systems ("DCSs"), wherein one of the DCSs is assigned to a developer via an assignment,
  a transport management system ("TMS"),
  a test system ("TS") being coupled by a network,
  a change management computer system ("CMCS") comprising a workflow engine for enforcing and documenting a workflow for processing a plurality of change documents, wherein at least one of the change documents is assigned to the developer and comprises a specification for specifying a desired functionality of the software code, the change document comprising an assigned change document identifier and a change document status, wherein the status comprises one of: a first status ("development approved"), a second status ("implemented"), a third status ("successfully tested") or a fourth status ("productive"), and
  wherein the TS and the PS have a respective deployment interface, controlled by the CMCS, for deploying of an artifact, the method comprising:
    outputting the assignment of the change document identifier to the developer by the CMCS;
    pulling a copy of master code from the SCMS onto the DCS of the developer;
    entering changes to the copy of the master code into DCS to provide staging code that has desired functionality;
    sending a request for staging a code push from the DCS to the SCMS for storing the staging code on the SCMS, wherein the request comprises the change document identifier;
    executing the request by the SCMS and embedding the change document identifier into the staging code;
    sending a request for voter build of the staging code from the SCMS to CI;
    executing the request for voter build by the CI by obtaining the staging code from the SCMS, extracting the document identifier from the staging code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the staging code, testing the artifact,
    wherein if the test is successful:
      merging the staging code with the master code and storing the merged master code on the SCMS to enable access to the changed master code resulting from the merging by other developers;

sending a request for CI build of the master code from the SCMS to CI;

executing the request for CI build by the CI by obtaining the master code from the SCMS, extracting the document identifier from the master code, wherein the CI uses the CMCS to check whether (i) the extracted change document identifier matches the change document identifier of the CMCS, (ii) the assigned status being the first status, and (iii) the assignment is to the developer, and only if all conditions (i) to (iii) are fulfilled generating an artifact for the master code, testing the artifact;

sending a request from CI to CMCS for the creation of a container, the request comprising the change document identifier, wherein the CMCS uses the TMS for the creation of the container, the TMS returning a container identifier to CMCS;

sending the artifact from CI to CMCS, wherein the CMCS inserts the artifact into the container provided by TMS; and sending a request from the CI to the CMCS for transitioning the status from the first to the second status, the request comprising the change document identifier, wherein the CMCS triggers the TMS to deploy the container on the TS whereby the CMCS controls the deployment interface of the TS to allow deployment of the artifact inside the container; and testing the artifact on the TS by a tester and if successful, sending a request from the TS to the CMCS for transitioning the status from the second to the third status, the request comprising the change document identifier; and confirming the change document by a change manager, wherein the confirming comprises triggering the processing in the CMCS for transitioning the status from the third to the fourth status, wherein the CMCS triggers the TMS to deploy the container on the PS, whereby the CMCS controls the deployment interface of the PS to allow deployment of the artifact inside the container.

20. The non-transitory computer readable medium of claim 19, wherein the deployment interface having a blocked status and an unblocked status, the blocked status being a default status, wherein the deployment interface is configured to allow entry of a container containing an artifact if the deployment interface is in its unblocked status, wherein the deployment interface receives a control signal from the CMCS for deploying of an artifact.

* * * * *